United States Patent
Lange et al.

(10) Patent No.: US 11,563,598 B2
(45) Date of Patent: Jan. 24, 2023

(54) METHOD FOR OPERATING AN ETHERCAT FIELDBUS SYSTEM, AND ETHERCAT FIELDBUS SYSTEM

(71) Applicant: Lenze Automation GmbH, Aerzen (DE)

(72) Inventors: Andre Lange, Huellhorst (DE); Lars Kuehne, Meine (DE); Thorsten Niemann, Bielefeld (DE)

(73) Assignee: Lenze Automation GmbH, Aerzen (DE)

( * ) Notice: Subject to any disclaimer, the term of this patent is extended or adjusted under 35 U.S.C. 154(b) by 84 days.

(21) Appl. No.: 16/641,514

(22) PCT Filed: Aug. 2, 2018

(86) PCT No.: PCT/EP2018/071019
§ 371 (c)(1),
(2) Date: Feb. 10, 2021

(87) PCT Pub. No.: WO2019/038047
PCT Pub. Date: Feb. 28, 2019

(65) Prior Publication Data
US 2021/0160096 A1    May 27, 2021

(30) Foreign Application Priority Data
Aug. 25, 2017 (DE) ..................... 10 2017 214 893.4

(51) Int. Cl.
*H04L 12/66* (2006.01)
*H04L 12/40* (2006.01)

(52) U.S. Cl.
CPC .. *H04L 12/40195* (2013.01); *H04L 12/40078* (2013.01); *H04L 12/40189* (2013.01)

(58) Field of Classification Search
CPC ........ H04L 12/40195; H04L 12/40078; H04L 12/40189
See application file for complete search history.

(56) References Cited

U.S. PATENT DOCUMENTS

| | | | |
|---|---|---|---|
| 2010/0088442 A1* | 4/2010 | Kuschke | G06F 13/364 710/110 |
| 2010/0241773 A1* | 9/2010 | Rostan | H04L 12/403 710/110 |

(Continued)

FOREIGN PATENT DOCUMENTS

| | | |
|---|---|---|
| CN | 1747431 A | 3/2006 |
| CN | 101355482 A | 1/2009 |

(Continued)

OTHER PUBLICATIONS

Chinese-language Office Action issued in Chinese Application No. 201880055172.5 dated Apr. 23, 2021 with English translation (10 pages).

(Continued)

*Primary Examiner* — Abdelnabi O Musa
(74) *Attorney, Agent, or Firm* — Crowell & Moring LLP

(57) ABSTRACT

An EtherCAT fieldbus system has an EtherCAT master and a number of EtherCAT slaves. The EtherCAT master and the number of EtherCAT slaves are coupled together by an EtherCAT fieldbus in order to exchange data. A method ascertains active EtherCAT slaves by way of the EtherCAT master; requests respective product codes of the active EtherCAT slaves by way of the master; ascertains a respective device identification of the active EtherCAT slaves from the respective product codes by way of the EtherCAT master, and switches the state of the EtherCAT fieldbus system into the operational state by way of the EtherCAT (Continued)

master if the respective device identification of the active EtherCAT slaves matches a specified device identification.

6 Claims, 1 Drawing Sheet

(56) References Cited

U.S. PATENT DOCUMENTS

| | | | | |
|---|---|---|---|---|
| 2013/0097273 | A1* | 4/2013 | Yoon | H04L 12/40169 |
| | | | | 709/208 |
| 2013/0173868 | A1* | 7/2013 | Leyrer | H04L 12/40013 |
| | | | | 711/152 |
| 2015/0012140 | A1* | 1/2015 | Fang | G05B 19/0421 |
| | | | | 700/275 |
| 2015/0172220 | A1* | 6/2015 | Rahamim | H04L 49/351 |
| | | | | 370/389 |
| 2016/0171627 | A1 | 6/2016 | Lyubarskiy | |

FOREIGN PATENT DOCUMENTS

| | | |
|---|---|---|
| CN | 202362658 U | 8/2012 |
| CN | 106294155 A | 1/2017 |
| CN | 107071077 A | 8/2017 |
| DE | 10 2012 214 693 A1 | 2/2013 |
| DE | 10 2012 221 487 B3 | 5/2014 |

OTHER PUBLICATIONS

International Search Report (PCT/ISA/210) issued in PCT Application No. PCT/EP2018/071019 dated Nov. 28, 2018 with English translation (four (4) pages).

German-language Written Opinion (PCT/ISA/237) issued in PCT Application No. PCT/EP2018/071019 dated Nov. 28, 2018 (six (6) pages).

Hentschel U., et al. "Automatic Device Scans in EtherCAT Networks with Cable Redundancy", 2015 IEEE 20th Conference on Emerging Technologies & Factory Automation (ETFA), Sep. 8, 2015, pp. 1-8, XP032797453, Dresden, Germany (eight (8) pages).

"ETG.1020 EtherCAT Protocol Enhancements", Sep. 17, 2010, pp. 1-91, Nuremberg, Germany, XP055356004, https://www.Ethercat.org/ (91 pages).

"AX5000 Systemhandbuch Hardware 2-Version 2.5", Beckhoff Information System, Beckhoff New Automation Technology, www.Beckhoff.de (two (2) pages).

"EC-Master EtherCAT® Master Stack Data Sheet", EC Master, pp. 1-7, acontis technologies GmbH (seven (7) pages).

"PC-Karten cifX PCI (CIFX 50), PCI Express (CIFX 50E), Low Profile PCI Express (CIFX 70E, CIFX 100EH)—Installation, Bedienung und Hardware-Beschreibung", Hilscher Gesellschaft fur Systemautomation mbH, 2014, vol. 12, Hilscher, Germany (five (5) pages).

"EtherCAT", Wikipedia, May 12, 2019, https://de.wikipedia.org/w/index.php?title=EtherCAT&oldid=188502711 (seven (7) pages).

"ETG.2200 EtherCAT Slave Implementation Guide V2.0.0", EtherCAT® Technology Group, Jan. 2, 2012, pp. 1-59 (59 pages).

Hentschel W., et al. "Automatic Device Scans in EtherCAT Networks with Cable Redundancy", 2015 IEEE 20th Conference on Emerging Technologies & Factory Automation (ETFA), Sep. 8, 2015, pp. 1-8, XP032797453, Dresden, Germany (eight (8) pages).

German-language Office Action issued in German Application No. 10 2017 214 893.4 dated Apr. 20, 2022 (10 pages).

Knezic et al., "Increasing EtherCAT Performance Using Frame Size Optimization Algorithm," IEEE ETFA2011, Conference: Sep. 5-9, 2011, pp. 1-4 (four (4) pages).

* cited by examiner

METHOD FOR OPERATING AN ETHERCAT FIELDBUS SYSTEM, AND ETHERCAT FIELDBUS SYSTEM

BACKGROUND AND SUMMARY OF THE INVENTION

The invention relates to a method for operating an EtherCAT fieldbus system and to an EtherCAT fieldbus system.

For EtherCAT (ETC) bus communication, an EtherCAT master requires a predetermined configuration, the so-called ENI file, in which the bus topology with the corresponding slaves and their identification features and ETC properties are specified.

Conventionally, the EtherCAT master identifies the EtherCAT slaves on the bus and compares the identified properties with the corresponding information in the EM file, in order to be able to parameterize the identified EtherCAT slaves with their further properties. Identification features of the EtherCAT slaves are in this case: vendor ID, product code and revision. If the bus configuration that is found does not match the bus configuration in the ENI file with regard to the identified EtherCAT slaves, the starting up of the bus goes to a "bus mismatch" fault. Otherwise, reference should be made to the relevant EtherCAT specification, in particular to the terminology used there, in particular concerning the terms EtherCAT master, EtherCAT slave, product code, operational, etc.

The invention is based on the object of providing a method for operating an EtherCAT fieldbus system and providing an EtherCAT fieldbus system that allow reliable starting (up) of the EtherCAT fieldbus system.

The invention achieves this object by a method for operating an EtherCAT fieldbus system and by an EtherCAT fieldbus system according to the independent claims.

The method serves for operating an EtherCAT fieldbus system.

The EtherCAT fieldbus system conventionally comprises an EtherCAT master and a number (for example 1 to 100) of EtherCAT slaves.

The EtherCAT master and the number of EtherCAT slaves are conventionally coupled to one another by means of an EtherCAT fieldbus for data exchange.

The method comprises the following steps.

First, the EtherCAT master ascertains the active or activated EtherCAT slaves on the EtherCAT fieldbus, in that for example it issues a request to the EtherCAT fieldbus and monitors which EtherCAT slaves respond.

Then, the EtherCAT master requests the respective product codes of the active EtherCAT slaves.

Then, the EtherCAT master ascertains a respective device identification of the active EtherCAT slaves from the respective product codes.

The overall state of the EtherCAT fieldbus system (bus state) can be transferred into the operational state by means of the EtherCAT master if (all of) the respective device identifications of the active EtherCAT slaves coincide with a predetermined device identification. Otherwise, for example, a procedure for handling a fault is followed. In other words, if there is a successful subsequent product code check, the EtherCAT master switches to the operational bus state.

The predetermined device identification may be identical for all EtherCAT slaves or may be specific to the EtherCAT slaves.

Alternatively, only those EtherCAT slaves for which the respective device identifications coincide with the predetermined device identification can be transferred into the operational state by means of the EtherCAT master.

According to one embodiment, the EtherCAT master reads an ENI file, the ENI file containing product codes of the number of EtherCAT slaves, the product codes containing the respective predetermined device identifications of the number of EtherCAT slaves.

According to one embodiment, the respective product codes comprise the device identification and an application identification.

According to one embodiment, when requesting the product codes of the active EtherCAT slaves by means of the EtherCAT master, the active EtherCAT slaves transfer their respective product code and an associated product code mask to the EtherCAT master, the EtherCAT master ascertaining the respective device identification by logically combining the respective product code with the respectively associated product code mask.

According to one embodiment, the EtherCAT master ascertains a respective application identification of the active EtherCAT slaves from the respective product codes.

The EtherCAT fieldbus system according to the invention comprises an EtherCAT master and a number of EtherCAT slaves, the EtherCAT master and the number of EtherCAT slaves being coupled to one another by means of an EtherCAT fieldbus for data exchange. The EtherCAT master and the number of EtherCAT slaves are respectively formed for the purpose of performing a method according to one of the preceding claims.

The invention is described in detail below with reference to the figures.

DETAILED DESCRIPTION OF THE DRAWINGS

Figure 1:
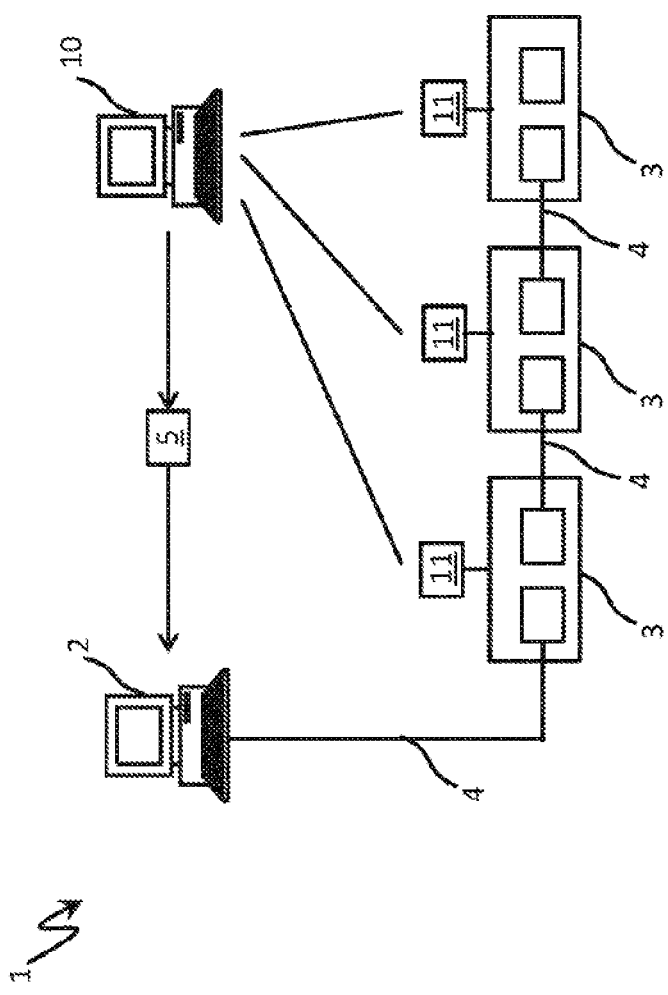
FIG. 1 shows an EtherCAT fieldbus system according to an embodiment of the invention.

FIG. 1 shows an EtherCAT fieldbus system 1 with an EtherCAT master 2, a number (three in the present case by way of example) of EtherCAT slaves 3 and a diagnostic and/or commissioning device (EtherCAT configuration tool) 10. The EtherCAT master 2 and the number of EtherCAT slaves 3 are coupled to one another by means of an EtherCAT fieldbus 4 of the EtherCAT fieldbus system 1 for data exchange.

Starting up, starting or running up of the EtherCAT fieldbus system 1 comprises the following steps.

Figure 2:
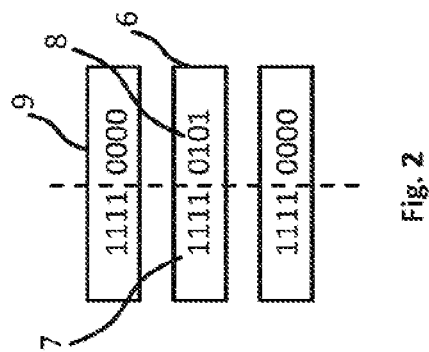
FIG. 2 shows, by way of example, a product code containing a device identification and an application identification and also an associated product code mask, which are used in the EtherCAT fieldbus system from FIG. 1.

The EtherCAT master 2 determines the active EtherCAT slaves 3 and then requests the respective product codes 6, see FIG. 2, of the active EtherCAT slaves 3.

Thereafter, the EtherCAT master 2 ascertains a respective device identification 7, see FIG. 2, of the active EtherCAT slaves 3 from the respective product codes 6 by using a product code mask 9, see FIG. 2, and switches the state of the EtherCAT fieldbus system 1 to the operational state if the respective device identifications 7 of the active EtherCAT slaves 3 coincide with a predetermined device identification, which the EtherCAT master 3 reads out from an ENI file 5.

The product codes and further items of information concerning the EtherCAT slaves 3 are contained in respective EtherCAT slave information (ESI) files 11. The ENI file 5 and the ESI files 11 are conventionally generated by means of the diagnostic and/or commissioning device 10.

The system bus handling is based on the concept of the so-called "SuperSet ENI" of the manufacturer Acontis, but with a (partially) deactivated product code check of the EtherCAT master. In the case of this method, the ENI file has the full version of the bus with the likely slaves (for example 15). After an EtherCAT master initialization, it is detected by a bus scan how many slaves on the bus are currently activated (for example 3). In the next step, the slaves that are not among the number are filtered out from the ENI file and are not considered any further in the further starting-up process. The conventional 1:1 product code checking in the EtherCAT master stack is deactivated according to the invention, since the connected EtherCAT slaves may vary on account of their set technology application, which is represented in the application identification.

With reference to FIG. 2, the product code 6 of the EtherCAT slaves according to the invention may be built up on the basis of a fixed scheme. The first part of the product code 6 contains for example the device identification 7 and the second part mirrors the activated technology application by its application identification 8.

For the masking of the application identification 8, the product code mask 9 may be provided. The product code mask 9 may also serve for the identification of other device features, which are coded in the one product code 6.

Each configured EtherCAT slave 3 provides the likely "default" product code 6 and the product code mask 9. Consequently, an EtherCAT driver can mask out the "default" and the found product code. If they coincide, this is an EtherCAT slave with system bus capability, which supports generic mapping.

According to the invention, it is possible that fieldbus subscribers start up in the operational state without configuration of the ENI file, independently of the number of EtherCAT slaves (up to a maximum defined number) and their EtherCAT application code and without a prior address allocation of a nonvolatile address (for example 2nd station address) of the slaves, it being ensured that also only compatible EtherCAT slaves are connected to the EtherCAT fieldbus.

This also allows the loading of different technology applications, which can be stimulated via the generic EtherCAT interface. On the basis of a selected technology application on the fieldbus subscriber, the product code can vary, in order to be able to identify the fieldbus subscriber together with the set technology application.

The method according to the invention offers advantages in comparison with the EtherCAT "HotConnect" method, since according to the invention no prior address allocation of nonvolatile addresses of the subscribers is necessary.

Furthermore, it is not necessary that, in addition to the allocated nonvolatile address, also the product code of the slaves found must coincide 1:1 with the configured state.

What is claimed is:

1. A method for operating an Ethernet for Control Automation Technology (EtherCAT) fieldbus system, the EtherCAT fieldbus system comprising an EtherCAT master and a number of EtherCAT slaves, the EtherCAT master and the number of EtherCAT slaves being coupled to one another by an EtherCAT fieldbus for data exchange, the method comprising the steps of:

ascertaining active EtherCAT slaves via the EtherCAT master;
requesting respective product codes of the active EtherCAT slaves via the EtherCAT master;
ascertaining a respective device identification of the active EtherCAT slaves from the respective product codes via the EtherCAT master; and
switching the state of the active EtherCAT slaves, via the EtherCAT master, into an operational state when the respective device identifications of the active EtherCAT slaves coincide with a predetermined device identification.

2. The method according to claim 1, further comprising the step of:
reading an EtherCAT Network Information (ENI) file via the EtherCAT master, the ENI file containing the product codes of the number of EtherCAT slaves, the product codes containing the respective predetermined device identifications of the number of EtherCAT slaves.

3. The method according to claim 1, wherein
the respective product codes comprise the device identification and an application identification.

4. The method according to claim 1, wherein
when requesting the product codes of the active EtherCAT slaves via the EtherCAT master, active EtherCAT slaves transfer their respective product code and an associated product code mask to the EtherCAT master, and
the EtherCAT master ascertains the respective device identification by logically combining the respective product code with the respectively associated product code mask.

5. The method according to claim 4, further comprising the step of:
ascertaining the respective application identification of the active EtherCAT slaves from the respective product codes via the EtherCAT master.

6. An Ethernet for Control Automation Technology (EtherCAT) fieldbus system, comprising:
an EtherCAT master;
a number of EtherCAT slaves, wherein
the EtherCAT master and the EtherCAT slaves each comprise a memory and a processor;
an EtherCAT fieldbus coupling the EtherCAT master and the number of EtherCAT slaves to one another for data exchange, wherein
the EtherCAT master and the number of EtherCAT slaves are configured to operate the EtherCAT fieldbus system by:
ascertaining active EtherCAT slaves via the EtherCAT master;
requesting respective product codes of the active EtherCAT slaves via the EtherCAT master;
ascertaining a respective device identification of the active EtherCAT slaves from the respective product codes via the EtherCAT master; and
switching the state of the active EtherCAT slaves, via the EtherCAT master, into an operational state when the respective device identifications of the active EtherCAT slaves coincide with a predetermined device identification.

* * * * *